S. KUCHARSKI.
APPARATUS FOR INTERMITTENTLY MOVING FORWARD THE PICTURE FILM FOR CINEMATOGRAPHS OR THE LIKE.
APPLICATION FILED MAR. 19, 1914.

1,143,977.

Patented June 22, 1915.

Witnesses:
Charles B. Crompton
Mary L. Luttrell

S. Kucharski.
Inventor:
By G. Peroyeon Marks
Attorney.

UNITED STATES PATENT OFFICE.

STANISLAUS KUCHARSKI, OF WAIDMANNSLUST, NEAR BERLIN, GERMANY.

APPARATUS FOR INTERMITTENTLY MOVING FORWARD THE PICTURE-FILM FOR CINEMATOGRAPHS OR THE LIKE.

1,143,977.

Specification of Letters Patent.

Patented June 22, 1915.

Application filed March 19, 1914. Serial No. 825,929.

*To all whom it may concern:*

Be it known that I, STANISLAUS KUCHARSKI, a subject of the German Emperor, and residing at Waidmannslust, near Berlin, Germany, have invented certain new and useful Improvements in Apparatus for Intermittently Moving Forward the Picture-Film for Cinematographs or the like, of which the following is a specification.

The present invention relates to an apparatus for intermittently moving forward the picture film for cinematographs or the like.

The intermittent feeding of picture films has hitherto been effected by special mechanical devices which received their intermittent movement by direct drive from the driving mechanism.

The present invention consists in that the uniformly moved picture film itself operates a mechanism which moves a part of the picture film intermittently.

The invention is illustrated by way of example in the accompanying drawings, in which:—

Figure 2:
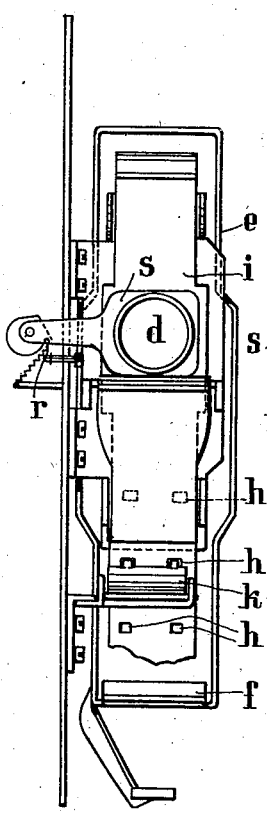
Figure 1:
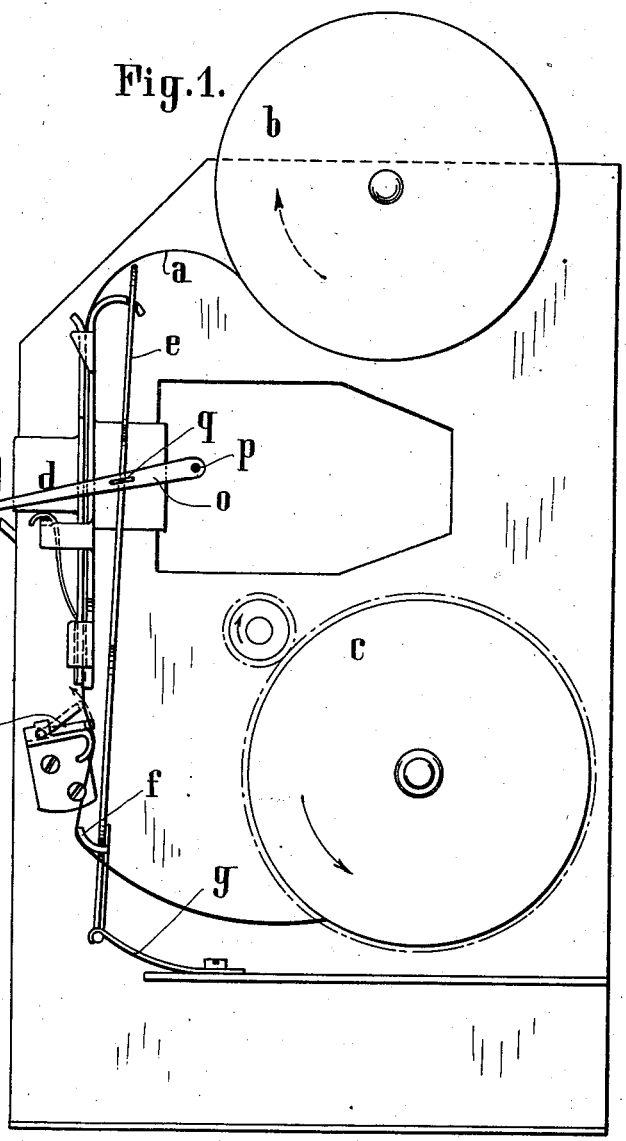
Figure 3:
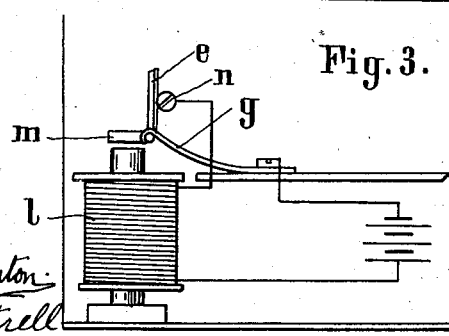

Figure 1 is a side-view of the apparatus, Fig. 2 is a partial front-view, and Fig. 3 shows the arrangement by means of which the spring action is assisted by an electromagnet.

The film $a$ runs over the one spool $b$ past the objective $d$ to the other spool $c$ in a known manner. The spool $c$ is driven in any suitable manner. The objective is surrounded by a wire-frame $e$ above whose upper and lower ends the film $a$ is guided. A plate $f$ is provided at the lower end of the frame for protecting the film. The frame $e$ itself is permanently under the tension of a spring $g$. The film is provided with perforations $h$ arranged in horizontal pairs side by side and spaced the distance of each picture. Below the objective or window $d$, the front part $i$ of which is removable for the purpose of inserting the film, is situated a claw $k$ the purpose of which is to engage in the perforations $h$ in the film. The claw $k$ is jointedly or resiliently secured, so that on the drawing back of the film, said claw can deviate as shown in Fig. 1 dotted and in Fig. 2.

On the rotation of the spool $c$, the film which is held by the claw $k$ is tensioned and because of this tension, pressure of the film on the plate $f$ causes the frame $e$ to rise against the action of the spring $g$ and simultaneously swing somewhat backward because the spring $g$ acts as a swinging arm. The perforations $h$ of the film are thus released from the claw $k$ and the frame $e$ is caused by the tension of the spring $g$ to move downward taking the film with it, until the claw $k$ engages in the next-following perforation $h$. The process just described is continuously repeated, whereby an intermittent forward movement of the film is obtained.

With films having larger pictures it is preferable to assist the action of the spring $g$ by an electromagnet $l$ (Fig. 3). This magnet attracts the armature $m$ situated on the frame $e$ as soon as the spring $g$ in its uppermost position makes contact with the screw $n$ or the like.

The upper end of the frame $e$ supports the film $a$, so that on the frame rising, the film is already partly unwound from the spool $b$, so that on the subsequent sudden downward movement of the frame, a sudden pull on the film and on the spool is obviated.

The frame $e$ may be employed for actuating the shutter. A lever $o$ is pivotally mounted at $p$ and provided with a guiding slot $q$, so that the lever $o$ is moved upward and downward by the frame $e$. On the upward movement of the frame $e$, the end of the lever $o$ engages under a projection $r$ of the shutter $s$, thus lifting the latter with it. On the lever $o$ rising it will on account of its rotary movement become removed more and more from the projection on the shutter until at last the projection becomes released, whereupon the shutter is drawn downward by a spring into its initial position against a stop or the like.

On the downward movement of the frame $e$, the lever $o$, which is of resilient construction, springs and slides over the projection $r$ of the shutter $s$, so that it again comes to lie below said projection.

The apparatus may be so constructed, that the resilient end of the lever $o$ is held securely by a stop, pin, or the like, until, in consequence of the rising of the frame $e$, the end of the lever $o$ springs upward past said stop, engages with the projection of the shutter causing same to move upward.

Having now described my invention what I claim as new and desire to secure by Letters Patent is:—

1. In an apparatus for intermittently feeding cinematograph films, the combination of means for holding a part of the film stationary, means for applying tension to the film, a device, operated by the tension on the film, to disengage the film and holding means and thereby permit movement of the film, and means for returning said device to its original position upon disengagement of the film.

2. In an apparatus for intermittently feeding cinematograph films, the combination of a catch claw for preventing movement of a part of the film, a movable frame operated by tension on the film to disengage the film and claw, means for returning said frame to original position upon disengagement of the film, and means for applying tension to the film.

3. In an apparatus for intermittently feeding cinematograph films, the combination of a catch claw for preventing movement of a part of the film, a movable frame operated by tension on the film to disengage the film and claw, a spring for returning said frame to original position upon disengagement of the film, and means for applying tension to the film.

4. In an apparatus for intermittently feeding cinematograph films, the combination of a movable catch claw for preventing forward movement of a part of the film, and permitting backward movement thereof, a movable frame operated by tension on the film to disengage the film and claw, means for returning said frame to original position upon disengagement of the film, and means for applying tension to the film.

5. In an apparatus for intermittently feeding cinematograph films, the combination of a catch claw for preventing movement of a part of the film, a movable frame operated by tension on the film to disengage the film and claw, a feeding spool, means on said frame for effecting a preliminary unwinding of the film from said spool, means for returning said frame to original position upon disengagement of the film, and means for applying tension to the film.

6. In an apparatus for intermittently feeding cinematograph films, the combination of a catch claw for preventing movement of a part of the film, a movable frame operated by tension on the film to disengage the film and claw, a spring for returning said frame to original position upon disengagement of the film, an electromagnet adapted to assist the action of said spring, and means for applying tension to the film.

7. In an apparatus for intermittently feeding perforated cinematograph films, the combination of a movable catch adapted to engage the perforations to prevent forward movement of a part of the film and permitting backward movement thereof, a movable frame operated by tension on the film to disengage the film from said claw, a feeding spool, means on said frame for effecting a preliminary unwinding of the film from said spool, a spring for returning said frame to original position upon disengagement of the film, and means for applying tension to the film.

In testimony whereof I have signed my name to this specification in the presence of two subscribing witnesses.

STANISLAUS KUCHARSKI.

Witnesses:
  HENRY HASPER,
  WOLDEMAR HAUPT.